Figure 10:
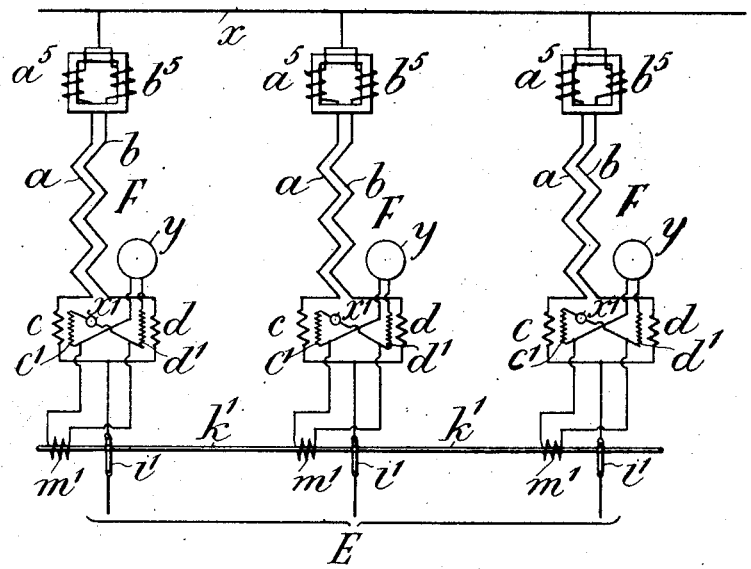

P. V. HUNTER.
ARRANGEMENT FOR PROTECTING ELECTRIC CIRCUITS AND APPARATUS.
APPLICATION FILED JULY 31, 1911.
1,088,901.
Patented Mar. 3, 1914.
5 SHEETS—SHEET 1.
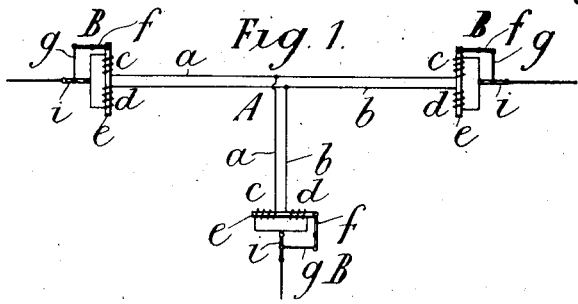
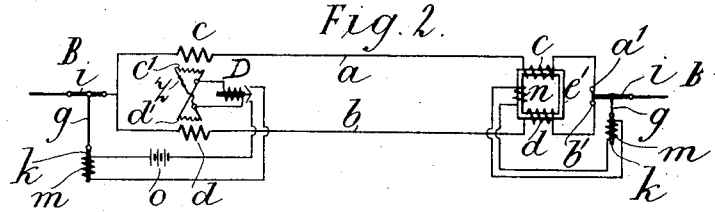
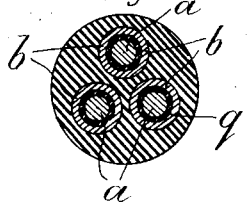 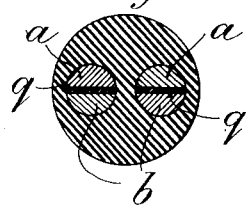 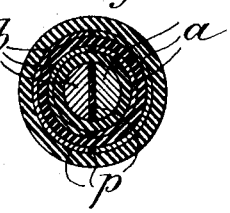
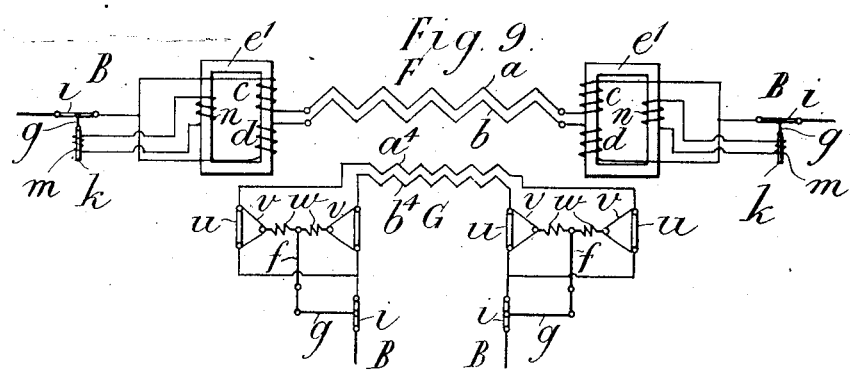
WITNESSES.
Erik Kneurling
Irene Lefkowitz
INVENTOR
PHILIP VASSAR HUNTER.
BY
Townsend & Decker
ATTORNEYS.

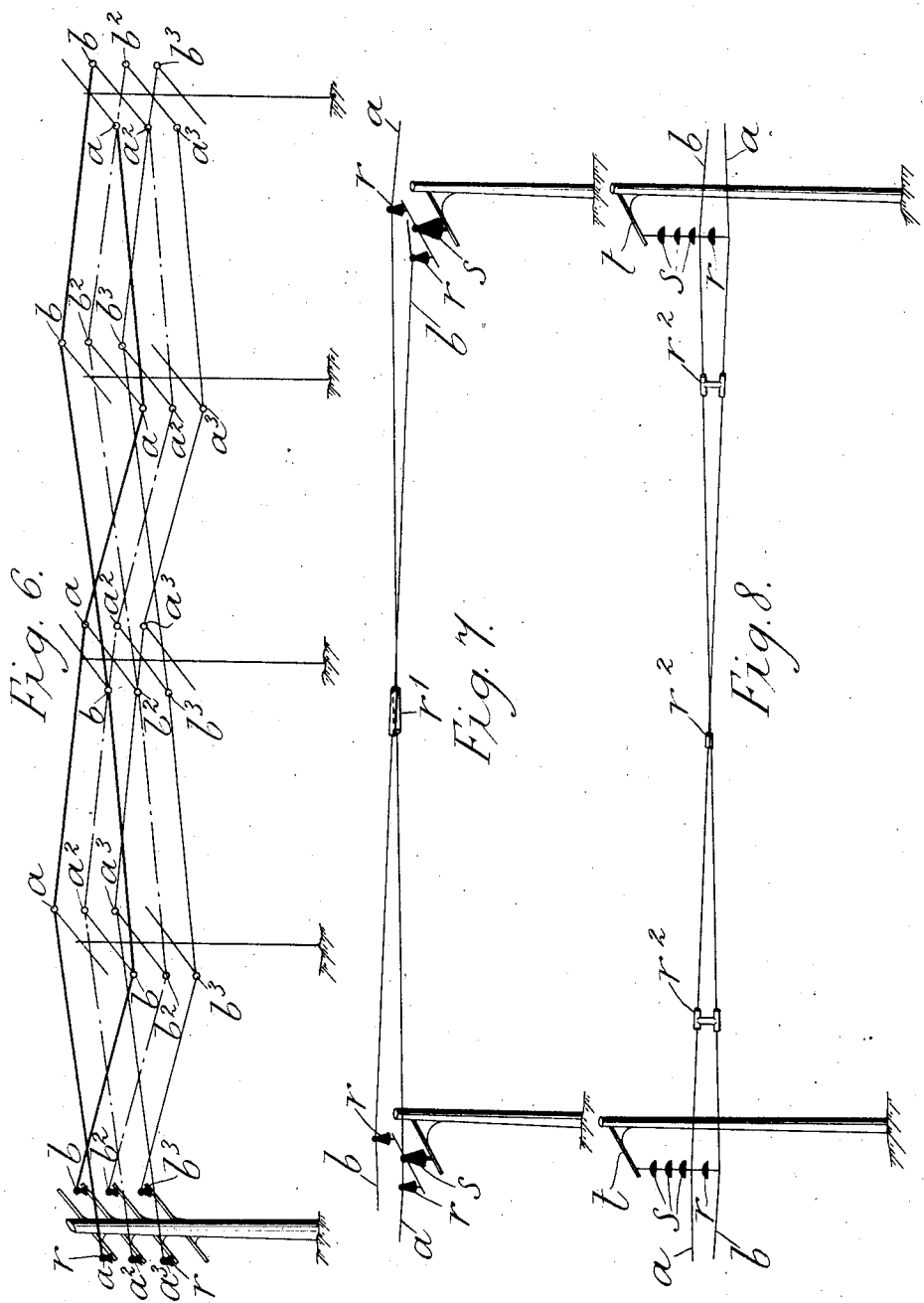

P. V. HUNTER.
ARRANGEMENT FOR PROTECTING ELECTRIC CIRCUITS AND APPARATUS.
APPLICATION FILED JULY 31, 1911.

1,088,901.

Patented Mar. 3, 1914.
5 SHEETS—SHEET 3.

WITNESSES.

INVENTOR
PHILIP VASSAR HUNTER
ATTORNEYS.

P. V. HUNTER.
ARRANGEMENT FOR PROTECTING ELECTRIC CIRCUITS AND APPARATUS.
APPLICATION FILED JULY 31, 1911.
1,088,901.
Patented Mar. 3, 1914.
5 SHEETS—SHEET 4.
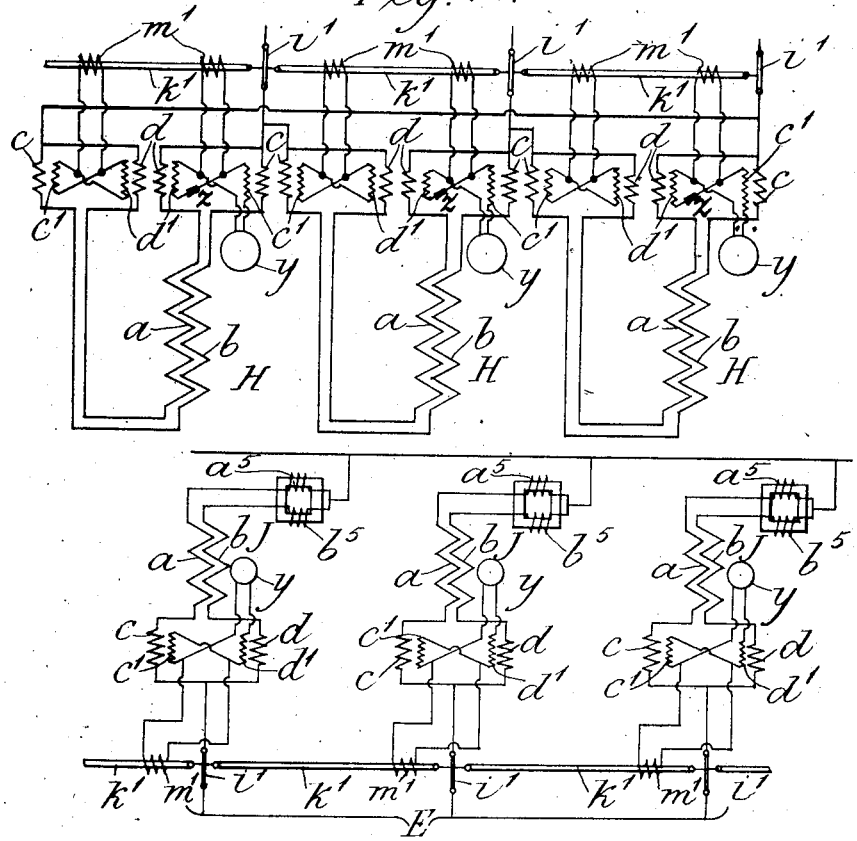
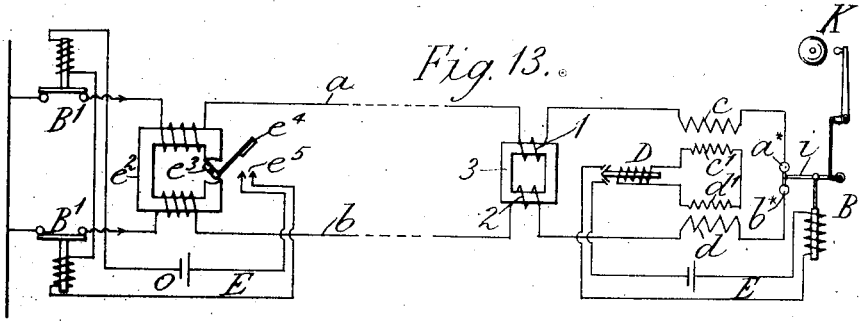
WITNESSES.
INVENTOR
PHILIP VASSAR HUNTER.
ATTORNEYS.

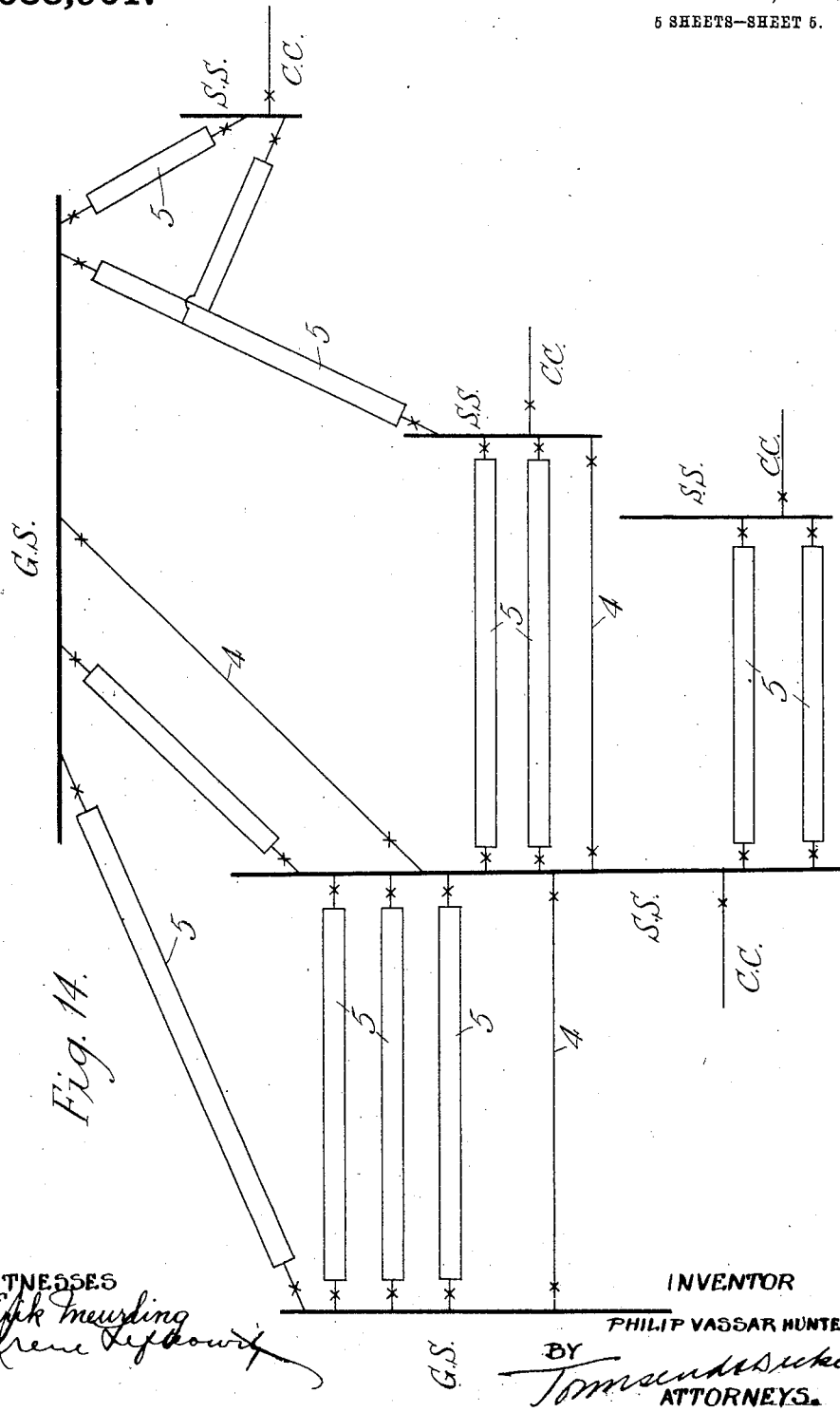

UNITED STATES PATENT OFFICE.

PHILIP VASSAR HUNTER, OF NEWCASTLE-UPON-TYNE, ENGLAND.

ARRANGEMENT FOR PROTECTING ELECTRIC CIRCUITS AND APPARATUS.

1,088,901.  Specification of Letters Patent.  Patented Mar. 3, 1914.

Application filed July 31, 1911. Serial No. 641,511.

*To all whom it may concern:*

Be it known that I, PHILIP VASSAR HUNTER, a subject of the King of Great Britain and Ireland, residing at Newcastle-upon-Tyne, in the county of Northumberland, England, have invented Arrangements for Protecting Electric Circuits and Apparatus, of which the following is a specification.

As is well known, numerous schemes have been from time to time proposed for securing the operation of circuit breakers pertaining to an electric current distributing system as soon as a normal balance between opposing electrical effects is disturbed by any cause. In practice the most efficient of these have proven to be the systems embodying pilot wires, but as pilot wires are in themselves objectionable, it is desirable to dispense with them if possible. Included in the attempts already made to secure the required protection without pilot wires has been the employment of feeders connected in parallel so that they normally carry equal currents, circuit breakers being associated therewith in such a manner as to be influenced by the current conditions existing in each of a pair of feeders, and thus secure a discriminating selection of the feeder to be cut out or of the order of cutting out the several feeders.

An object of the present invention is to provide arrangements, perfectly general in application, in which the required discriminating protection of a system is secured by causing the current conditions in the faulty feeder alone to influence the circuit breaker or breakers associated therewith and cut it out.

Another object of the invention is to provide a system employing cables, the number of which, considering the requirement of discriminating protection, is reduced by one half, and hence also descreasing the initial outlay.

Another object of the invention is to provide arrangements whereby, without using pilot wires, it is insured that all circuit breakers associated with a feeder, and only such circuit breakers, shall operate in a practically instantaneous manner, which, for commercial success, is absolutely necessary if proper and economical protection is to be secured.

With these and other objects hereinafter appearing it is arranged that the feeder (hereinafter, under the generic term circuit section, intended to embrace a winding of alternating and continuous current apparatus in which there is no commutator, including motors and transformers) shall comprise parallel connected leads that shall experience an electromotive force derived inductively when leakage occurs so that the difference in currents in the leads affecting the trip gear of the cut-out switches becomes greater than that due to leakage *per se* and hence materially increases the sensitiveness of the protection. The increased difference between the currents in the leads may be due to the reaction of one lead upon the other through mutual induction; to impedance devices; or to both in combination.

In the accompanying drawings, Figures 1 and 2 are diagrams of different feeder arrangements showing the application of the invention thereto. Figs. 3, 4 and 5 are sections of cables for such systems. Fig. 6 is a perspective view illustrating one way of supporting the leads independently. Figs. 7 and 8 are perspective views illustrating other ways of supporting the leads independently. Figs. 9, 10 11 and 12 are diagrams illustrating the invention applied to the protection of different apparatus. Fig. 13 is a diagram of a modified feeder arrangement. Fig. 14 is a diagram of an interconnected ring main system showing the invention applied thereto.

As shown in Fig. 1, the feeder A may be provided at its end with circuit breakers B and actuating devices therefor operating magnetically. The two leads $a$ $b$ of such a feeder having the same electrical potential and similar impedance and inductively arranged with relation to one another may include, at each end, windings $c$ $d$ associated with a magnetic solenoid core $e$, the windings being arranged to offer a special impedance to the flow of current from one lead to the other when leakage occurs. The two windings on each core $e$ comprise a similar number of turns so relatively arranged that when equal currents flow in the same direction in the leads $a$, $b$ there will be no pull on the core, but when the currents in the two leads have an algebraic difference, that is to say, in the case of direct currents, when the currents are dissimilar in magnitude, or direction, or dissimilar in magnitude and direction, and in the case of alternating currents when there is a vectorial difference in the currents, each of which differences are hereinafter referred to as "difference of currents," the core $e$ will move and the force tending to move it will be greater the greater the magnitude of the difference of currents as described above. The special impedance referred to is determined with reference to the total impedance of the leads $a$, $b$, their mutual inductance and the degree of equality obtainable in the impedance of $a$ and $b$. The movement of each core $e$ is communicated to the corresponding circuit breaker by any suitable means. In the example shown at the three ends of Fig. 1, each core $e$ operates a lever $f$, which, through a rod $g$ opens the switch member $i$. When leakage occurs from one of the leads $a$, $b$, for instance $b$, then lead $b$ will carry a greater proportion of the leakage current than the lead $a$, as any current passing through the lead $a$ to the leakage point has to overcome the impedance of three windings viz., $c$, $c$ and $d$, whereas any current passing through the lead $b$ to the leakage point has to overcome the impedance of only one winding, viz., $d$. The difference of currents in the windings $c$, $d$ will not necessarily be the same at each end of the feeder. At any particular end of the feeder the value of the difference of currents will vary between a maximum and minimum percentage of the leakage current, depending on the position of the leakage in the feeder. The smaller the impedance of $c$, $d$, the greater will be the maximum and the smaller the minimum values, expressed as a percentage of the leakage current. Also, the greater the impedance of $c$, $d$, the more nearly equal will become the maximum and minimum values. Since this applies equally to all ends of the feeder it is evident that by increasing the impedance of the windings $c$, $d$ the difference of currents at all ends of the feeder are made more nearly equal in the event of leakage from $a$ or $b$. For similar leakage currents therefore the effect of increasing the impedance of the windings $c$, $d$ is to increase the force controlling the circuit breaker at that end of the feeder where, due to the position of the leakage, the force is less than at the other end or ends, thereby insuring the practically simultaneous operation of the circuit breakers at the several ends of the feeder.

The effect of mutual induction is as follows: It is well known that when two unequal currents of changing magnitude are mutually inductively related, the ratio of their magnitude being constant at each instant of time, then the larger current has an inductive effect on the smaller which is a direct function of the difference of their rate of change of current with respect to time.

Omitting impedance from the windings $c$, $d$, then the lead from which the leakage occurs always carries either a greater proportion of the leakage current than the other lead, or the two leads divide the leakage current equally. Considering $a$ and $b$ mutually inductive and to form part of an alternating current circuit carrying load, there being leakage from lead $b$, and a greater current in $b$ than in $a$, then this greater current in $b$ induces in $a$ a voltage which tends to produce a circulating current in $a$, $b$ having the effect of increasing the difference of currents at that end of the feeder section where it is connected to the generating system, assuming that the feeder is connected to the generating system at one end only. If the feeder is connected to the generating system at more than one end, the effect of mutual induction is to increase the difference of currents at the end where the greater current flows into the feeder in the case where the difference in currents at this end of the feeder is less than at the other end.

Considering $a$ and $b$ as a direct current circuit, the effect of mutual induction will be of similar character to that in an alternating current circuit provided that the leakage current grows in value with respect to time. This is due to the fact that the rate of change of current with respect to time will be greatest in that portion of the circuit carrying the greatest proportion of leakage current.

The effect of impedance in combination with mutual induction as aforesaid is to modify the initial difference of current on which mutual induction depends for its action. Such an arrangement is applicable to either continuous or alternating current transmission and distribution systems.

Fig. 2 shows modifications appropriate for alternating current transmission and distribution systems. Here, as before, the two leads $a$, $b$ are inductively arranged with relation to one another and the windings $c$, $d$ at both ends arranged to offer impedance to the flow of current from one lead to the other. At the right hand side, the windings $c$, $d$ on the core $e^1$ pass to a circuit breaker B through terminals $a^1$, $b^1$, which are electrically disconnected when the circuit breaker is opened so that the leads $a$ and $b$ are disconnected from each other as well as from adjacent feeders. The movable switch member $i$ which here normally connects the terminals $a^1$ $b^1$ together and to the adjacent feeder is arranged to be operated by the core $k$ of a solenoid $m$ energized by current produced in a third winding $n$ on the core $e^1$ when the balance between the electrical conditions in the leads $a$ and $b$ is disturbed.

As shown at the left hand side of Fig. 2, there may be associated with each pair of adjacent windings $c$, $d$ in the leads $a$, $b$, a pair of windings $c^1$, $d^1$ constituting the secondary elements of a transformer adapted to supply current to a relay D when the normal balance is disturbed, such relay closing the circuit of a battery $o$ controlling, as for example through a solenoid $m$ and core $k$, the corresponding circuit breaker B. Normally while the currents in the leads $a$, $b$ are similar in direction, phase and magnitude, the relay will not be affected since it is connected to the equipotential points which are present, due to the cumulative connection of the secondary windings $c^1$, $d^1$ of the transformer. When the currents in the leads are dissimilar and there is in consequence a greater current flow in one of the windings $c^1$, $d^1$ than in the other, the points of connection are no longer of equipotential and a current will flow in the coil of the relay D thereby causing the closing of the circuit of the battery $o$ and thus bringing about the operation of the circuit breaker B.

The circuit breakers B and relays D may be of any suitable type, preferably non-resetting and so arranged that they will complete their operation even should the difference in currents between the two leads exist only momentarily.

To render the mutual induction between the leads as effective as possible, they are arranged as close to one another as possible, the said mutual induction in some cases being further increased by arranging the leads spirally one around another. Thus, for say a three phase system, there may, as shown in Fig. 3, be employed, a cable provided with a pair of leads $a\ b$ for each phase, the two leads of each pair being of similar electrical potential and arranged concentrically so as to be mutually inductive with a non-conducting separator $q$ between them and forming one core of the cable. As there is normally no difference of potential between the leads $a$, $b$, the non-conducting separator $q$ need have only sufficient insulating properties to withstand the momentary difference of pressure which would exist should a leakage occur from $a$ or $b$ to earth or another feeder. The two leads are extremely close together and have a maximum mutual induction. If it is desired to arrange the feeders so that the leads have equal impedance, the cable may be divided into an even number of equal lengths the inner conductor $a$ of one length being connected to the outer conductor $b$ of the adjacent length. This arrangement also prevents alteration to the division of current between the two leads by unequal inductive effects on the two leads of currents in adjacent feeders or earth.

In an alternative construction, shown in Fig. 4, the two leads $a$, $b$ of each pair of leads are arranged side by side so as to be mutually inductive with a non-conducting separator $q$ between them, each lead being, say, of semi-circular section as shown. The two leads may be arranged spirally around each other to increase the mutual induction and prevent unequal division of currents in the two leads due to the effect of currents in adjacent feeders or earth.

In a further alternative construction, shown in Fig. 5, the two leads $a$, $b$ of each pair, except the innermost pair, are of approximately hollow semi-circular cross sectional shape, such pairs being assembled to occupy concentrically arranged circular spaces in the cable at the center of which are arranged the two leads $a$, $b$ of solid semi-circular cross section.

The several duplex cores at different potential in the same cable are suitably insulated from each other but as the two leads of each core are of equal potential the separating material $q$ between them need not be of a highly insulating character, thus enabling the cables to be cheaply constructed.

In an overhead pole line the spiral arrangement of the pairs of leads $a\ b$ for the purpose specified may be secured as shown in Fig. 6. There the two leads $a$, $b$ of one feeder having equal impedance to the flow of current, may be supported by insulators $r$ insulating the main from earth and from the other mains and also forming non-conducting separators between the two leads. To obtain a maximum of mutual induction, the two leads $a$, $b$ should be arranged as close to one another as practicable, being merely shown wide apart in the drawing for the sake of clearness. The leads $a\ b$ of another feeder or feeders may be similarly supported by the same pole, the specific example depicting six leads designated respectively $a, b$; $a^2, b^2$; $a^3, b^3$. Or, as shown in Fig. 7, the two leads $a$, $b$ forming one section may be carried by insulators $r$ which are in turn carried by an insulator $s$ insulating the leads from earth, the requisite twisting being maintained without letting one lead $a$ come into contact with its companion lead $b$ by means of double insulating sleeves $r^1$. A further method of constructing an overhead line might, as shown in Fig. 8, consist in arranging the leads $a\ b$ one above the other with insulators $r\ s$ between the leads and between the uppermost lead and a suspending arm or bracket $t$, $r^2$ being insulating struts for keeping the leads properly apart.

Fig. 9 illustrates the invention applied to the protection of a single phase electric generator where the armature or stator winding, divided into two mutually inductive leads as stated, is provided at its two ends with circuit breakers B and actuating devices therefor operating electrically. The two leads $a\ b$ of the armature winding F having the same electrical potential at any point in the length of the winding, and similar impedance, may, as shown, include at each end, windings $c$, $d$ associated with a magnetic core $e^1$ and offering impedance to the flow of current from $a$ to $b$ and vice versa, each winding containing a similar number of turns and so relatively arranged that when equal currents flow in the leads $a$ $b$ there will be no magnetic flux in the core, but when the currents in the leads are unequal there will be a magnetic flux in the core which will energize a third winding $n$ thereon and operate the circuit breaker B by means of a solenoid $m$, or relay, connected to the ends of the winding $n$. This action will apply simultaneously to the circuit breaker B at each end of the armature winding, wherever the leakage may occur in the winding. If one end of the divided winding F be connected to earth the circuit breaker may be omitted at that end, but the windings $c$ $d$ and core $c^1$ or their equivalent, must be retained in order to offer impedance to the flow of current from $a$ to $b$ and vice versa. The divided field winding G of the single phase generator may be provided with circuit breakers and actuating devices operating thermally. Thus, the two mutually inductive leads $a^4$, $b^4$ of the field winding G may include at each end, resistances $u$ offering impedance to the flow of current from $a^4$ to $b^4$ and vice versa, with temperature circuits $v$ in parallel to them, meaning by a temperature circuit one which experiences a physical alteration with variation in temperature due to alteration in current flow. The two temperature circuits $v$ at one end of the field winding are mechanically connected together and to the circuit breaker B, as for example through springs $w$, in such a manner that while equal currents flow through the temperature circuits there is no movement of the mechanical connection but immediately the currents in the two leads $a^4$, $b^4$ are unequal, the mechanical pull of the two temperature circuits will be unequal and the circuit breaker B will be operated mechanically, as for instance through the lever $f$ and rod $q$. If desired, the circuit breaker may be included at one end only of the field winding G, but the thermal device, or its equivalent, must be retained in order to offer impedance to the flow of current from $a$ to $b$ and vice versa.

In some cases the thermal means described pertaining to the field winding G, may be used to operate the circuit breaker or breakers of the armature winding F as well as, or instead of, the circuit breaker or breakers of the field winding G. Similarly, the means described pertaining to the armature winding F adapted to operate the circuit breakers of such winding may be employed to operate the circuit breaker or breakers of the field winding.

For a 3-phase alternating current generator, each of the three armature or stator windings may be provided at one end with circuit breakers and devices operating electrically. Fig. 10 shows the armature of such a generator, each of the three phase armature windings F, comprising two mutually inductive leads $a$ $b$ which, at one end of the winding, are connected through windings $a^5$ $b^5$, offering impedance to the flow of current from one lead to the other, to the common terminal or conductor $x$ of all three phases and at the other end of the winding to the circuit breaker through transformers $c$ $c^1$ and $d$ $d^1$ offering impedance to the flow of current from $a$ to $b$ and vice versa, all the transformers for each winding being associated directly with the circuit breakers, constituting the cut out switch E, or controlling, in known way, separate relays any one of which is adapted to close the circuit of a local source of current for operating the cut out switch of the three windings. Conveniently, the secondary windings $c^1$ $d^1$ of the two current transformers pertaining to each divided main winding F may, as shown, be cross connected and have in shunt thereto a solenoid $m^1$ for operating the circuit breaker which comprises movable switch members $i^1$ and a magnetic rod $k^1$ common to such switch members and to the solenoids $m^1$. $x^1$ is a compensating resistance in the circuit of the cross connected secondary windings $c^1$ $d^1$. The field winding of such a generator may be arranged similarly to that of the single phase generator of Fig. 9.

Figure 11:
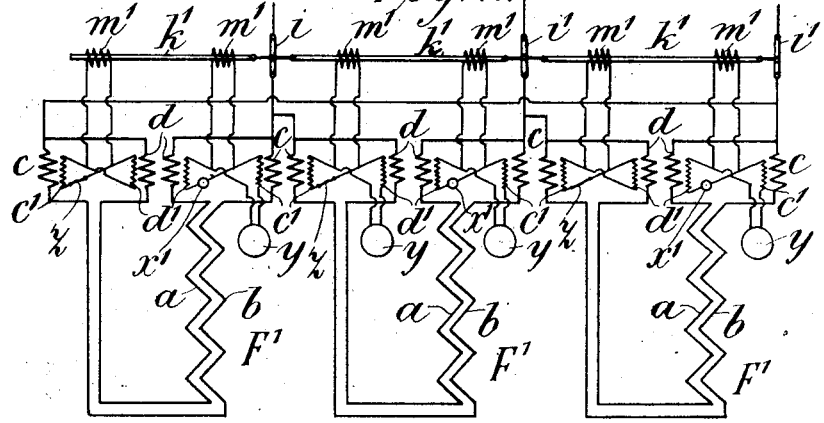

For a three phase motor with its armature windings $F^1$ mesh connected, as shown in Fig. 11, the two mutually inductive leads $a$ $b$ of each winding may be provided with current transformers $c$ $c^1$ and $d$ $d^1$ at each end offering impedance to the flow of current from $a$ to $b$, all current transformers for each end of each winding controlling a separate solenoid $m^1$ which is adapted for opening the cut-out switch $i^1$ of the motor, as in Fig. 10.

As shown in Fig. 12, the primary and secondary windings H, J respectively of a three-phase transformer may each be arranged similarly to the armature windings of the three-phase generator shown in Fig. 10, or of the three-phase motor shown in Fig. 11. The actuating devices of the secondary windings J may operate the cut-out switch of the primary windings H as well as or instead of the cut-out switch for the said secondary windings, and also the operating device of the primary windings H may operate the cut-out switch of the secondary windings J as well as or instead of the secondary cut-out switch.

The primary and secondary windings of a single phase transformer may each be arranged similarly to the windings of a single phase generator, as hereinbefore described with reference to Fig. 9.

With any of the circuit breaker operating devices in which currents are flowing in the secondary windings of current transformers while the currents of the two leads are equal, it is possible to use the same current transformers for the purpose of indicating or recording the value of the current in one or both leads $a$, $b$. For this purpose, the secondary windings $c^1$ $d^1$ of the current transformers at one or at each end of each of the divided main windings of the generator, or other apparatus being controlled, can be cross connected and have an ammeter $y$ in series circuit therewith as shown in Figs. 10, 11 and 12.

The impedance effect producing a difference of currents in the two leads may be obtained at any end of a feeder or winding independently of the circuit breaker operating devices by including in circuit with the leads at the end of the feeder or winding a special device for this purpose. As shown in Fig. 13, a winding 1 or 2 may be included in circuit with each lead $a$, $b$, the two windings being associated with a magnetic core 3 in such a manner that while the currents in the leads are similar there will be no flux in the core but should current tend to flow from one lead to the other there will be a flux in the core and the windings 1 and 2 will become inductive and offer impedance to the flow of current from one lead to the other lead through the terminal or terminals $a$, $b$ where the two leads are connected together at the end referred to; or the impedance effect may be obtained by similar resistances one being connected in circuit with each lead; or in any analogous way. When this impedance device is included in circuit with the leads it is permissible to use a circuit breaker operating device of the type which does not offer impedance to the flow of current from one lead to the other, such as is shown at the right hand side of Fig. 13, where the two mutually inductive leads $a$ $b$ have connected in circuit with them at each end, two current transformers $c$ $c^1$ and $d$ $d^1$ with their secondary windings $c^1$ $d^1$ connected so that while the currents in the two leads are equal the electromotive forces generated in the secondary windings are in opposition and no current will flow through the relay windings D but should the currents in the two leads $a$, $b$ be unequal a current will flow through each relay winding D and operate the corresponding circuit breaker B or B¹ by means of a subsidiary electrical circuit E, or by other means.

At the left hand side of Fig. 13 a separate circuit breaker B¹ is shown provided for each lead $a$ and $b$, the circuit-breaker-operating and impedance device being in the form of a core $e^2$ having an air gap in which is inserted a magnetic armature $e^3$ carrying a contact maker $e^4$, the armature being so arranged that while there is no flux in the core $e^2$ the contact maker is open as shown, but directly the flux passes through the core due to leakage from either lead, the armature will be rotated and the contact maker caused to close the circuit of an auxiliary current supply at $e^5$ which includes the trip coils of the circuit breakers B¹.

Any of the tripping arrangements described, as well as their equivalents, may be applied to operate a signal, for example a bell K, or shutter, as shown in Fig. 13, instead of, or as well as, the circuit breaker.

Where, as in Figs. 2, 9, 10, 11 and 12, currents are flowing in the secondary windings $c^1$ $d^1$ of current transformers while the currents of the two leads $a$ $b$ are equal, it is possible to use the discriminating device to operate the cut out switch on overloads. For this purpose it is merely necessary to insert a fuse, as shown at $z$ in Figs. 2, 11 and 12, in the secondary winding of one of the two current transformers. This fuse will blow when an overload occurs and allow the other current transformer to operate the circuit breaker and trip the switch.

The invention is particularly applicable to networks consisting of interconnected ring mains, as diagrammatically shown in Fig. 14, where G S represents the bus bars of a pair of generating stations; S S the bus bars of four sub-stations, and C C consumers circuits leading from the sub-stations. 4 represent feeders protected with the aid of say pilot wires as ordinarily, while 5 represent the improved feeders according to the invention.

As will be understood, the invention can be applied to apparatus having any number of windings or phases.

What I claim is:—

1. In an electrical power distributing system, a circuit section comprising two conductors connected in parallel, circuit breaking means at each end of the section, adapted to cut out both conductors completely, and devices for operating such circuit breaking means responsive only to a difference of currents in the two conductors due to leakage from one of them, the said conductors being each alone incapable of carrying the maximum load current of the section and being subject to an electromotive force, derived inductively when leakage occurs, in a direction to increase the difference of currents in the conductors.

2. In an electrical power distributing system, a circuit section comprising two conductors connected in parallel and having normally no difference of potential between them at any point in their length, circuit breaking means at each end of the section, adapted to cut out both conductors completely, and devices for operating such circuit breaking means responsive only to a difference of currents in the two conductors due to leakage from one of them, the said conductors being each alone incapable of carrying the maximum load current of the section and being arranged throughout in inductive relation one to the other whereby the difference of currents in the said conductors is increased.

3. In an electrical power distributing system, a circuit section comprising two conductors arranged in mutually inductive relationship, a single lead section adjacent to one end of such two conductor section and another single lead section at the opposite end thereof, circuit breaking means adapted to connect the two conductors of the first named section in parallel and to the single lead sections and devices for operating such circuit breaking means responsive only to a difference of currents in the conductors of the two-conductor section, the said conductors being each alone incapable of carrying the maximum load current and the circuit breakers acting simultaneously to disconnect the conductors of the two conductor section from each other and from the adjacent single lead sections.

4. In an electrical power distributing system, a circuit section comprising two conductors connected in parallel and arranged in mutually inductive relationship and means such as an impedance device associated with such conductors adapted upon any alteration in the proportion of current flowing in the said conductors due to leakage from one thereof, to increase the difference of currents, the mutually inductive relationship between the leads acting to still further increase the difference of currents.

Signed at Newcastle-upon-Tyne, England, this seventeenth day of July 1911.

PHILIP VASSAR HUNTER.

Witnesses:
H. NIXON,
FRED H. DUKE.